C. A. TRIPP & O. E. McMEANS.
CORN POPPING MACHINE.
APPLICATION FILED DEC. 9, 1916.

1,251,304.

Patented Dec. 25, 1917.
5 SHEETS—SHEET 3.

Witnesses
Frank A. Fable
Josephine Gasper

Inventors
Charles A. Tripp
Orange E. McMeans,
Hood & Schly.
Attorneys

C. A. TRIPP & O. E. McMEANS.
CORN POPPING MACHINE.
APPLICATION FILED DEC. 9, 1916.

1,251,304.

Patented Dec. 25, 1917.
5 SHEETS—SHEET 4.

WITNESSES:
Frank A. Fable
Josephine Casper

INVENTORS
Charles A. Tripp
Orange E. McMeans,
BY
Hood & Achley.
ATTORNEYS

C. A. TRIPP & O. E. McMEANS.
CORN POPPING MACHINE.
APPLICATION FILED DEC. 9, 1916.

1,251,304.

Patented Dec. 25, 1917.

5 SHEETS—SHEET 5.

WITNESSES:
Frank A. Fahle
Josephine Gasper

INVENTORS
Charles A. Tripp
Orange E. McMeans,
BY
Hood & Schley.
ATTORNEYS

UNITED STATES PATENT OFFICE.

CHARLES A. TRIPP AND ORANGE E. McMEANS, OF INDIANAPOLIS, INDIANA, ASSIGNORS TO HOLCOMB & HOKE MFG. CO., OF INDIANAPOLIS, INDIANA, A CORPORATION OF INDIANA.

CORN-POPPING MACHINE.

1,251,304.      Specification of Letters Patent.      Patented Dec. 25, 1917.

Application filed December 9, 1916. Serial No. 135,921.

*To all whom it may concern:*

Be it known that we, CHARLES A. TRIPP and ORANGE E. McMEANS, citizens of the United States, residing at Indianapolis, in the county of Marion and State of Indiana, have invented a new and useful Corn-Popping Machine, of which the following is a specification.

It is the object of our invention to produce a corn popping machine which will automatically feed unpopped corn to the popping element and discharge the popped corn when the popping has been completed, will keep the corn in continuous agitation during popping by a back and forth movement with a progressive advance, which does this without requiring any movable heating element, and which embodies a mechanism which by its movements attracts and interests the passer-by.

The accompanying drawings illustrate our invention.

Figure 1:
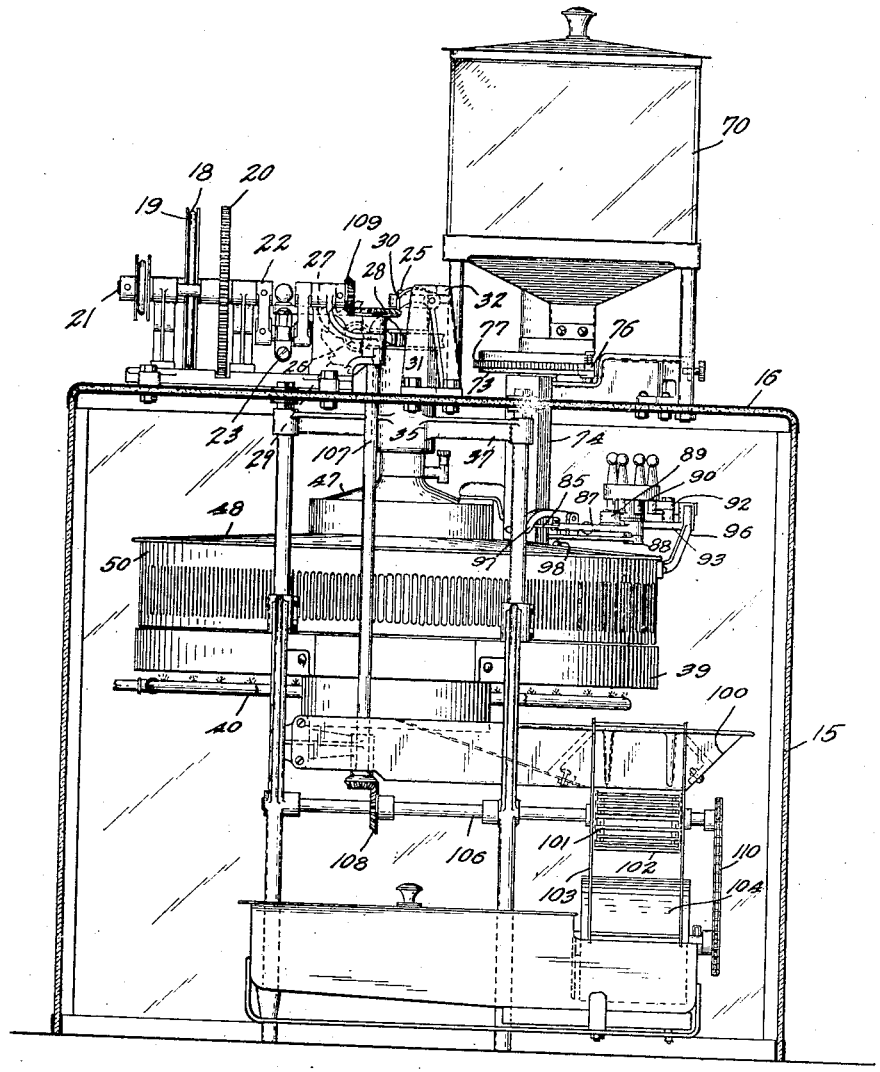
Figure 2:
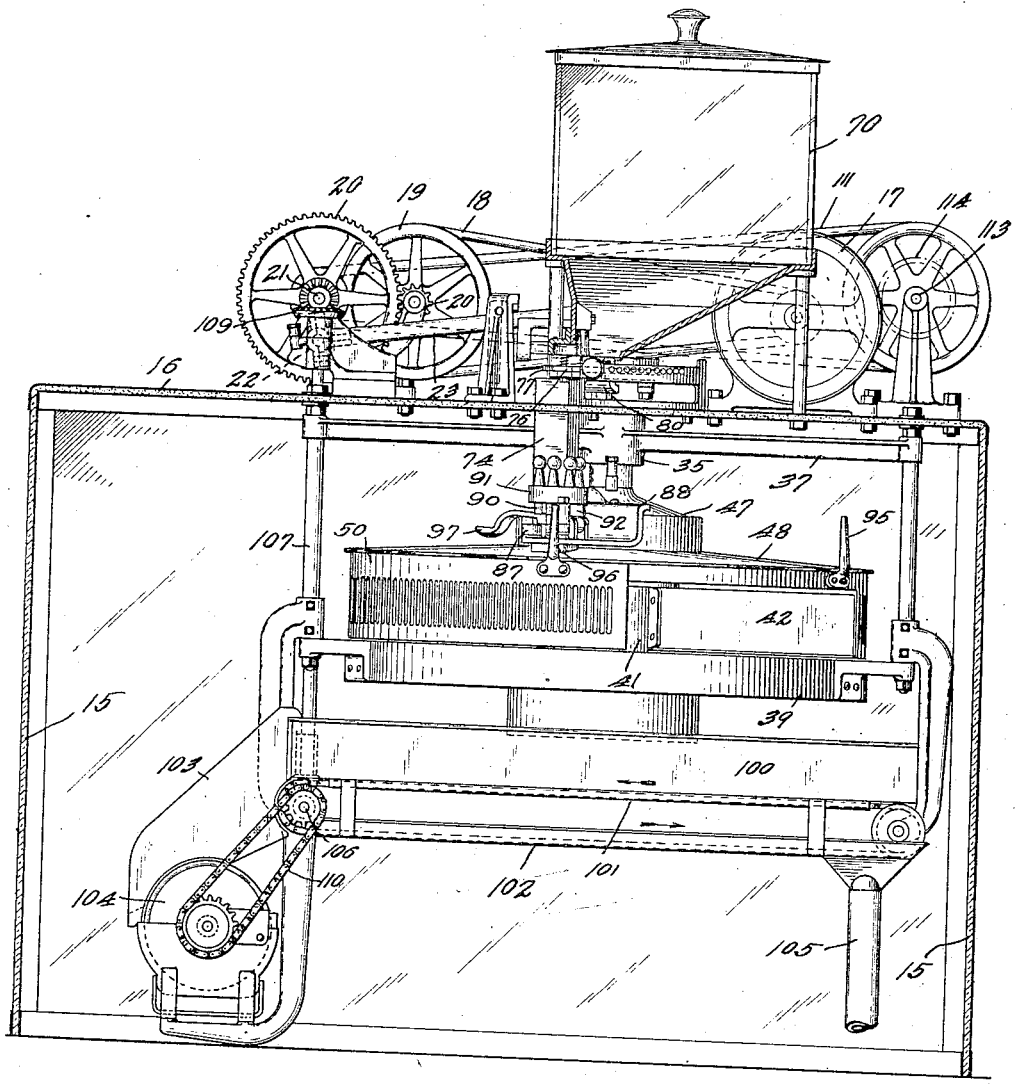
Figure 3:
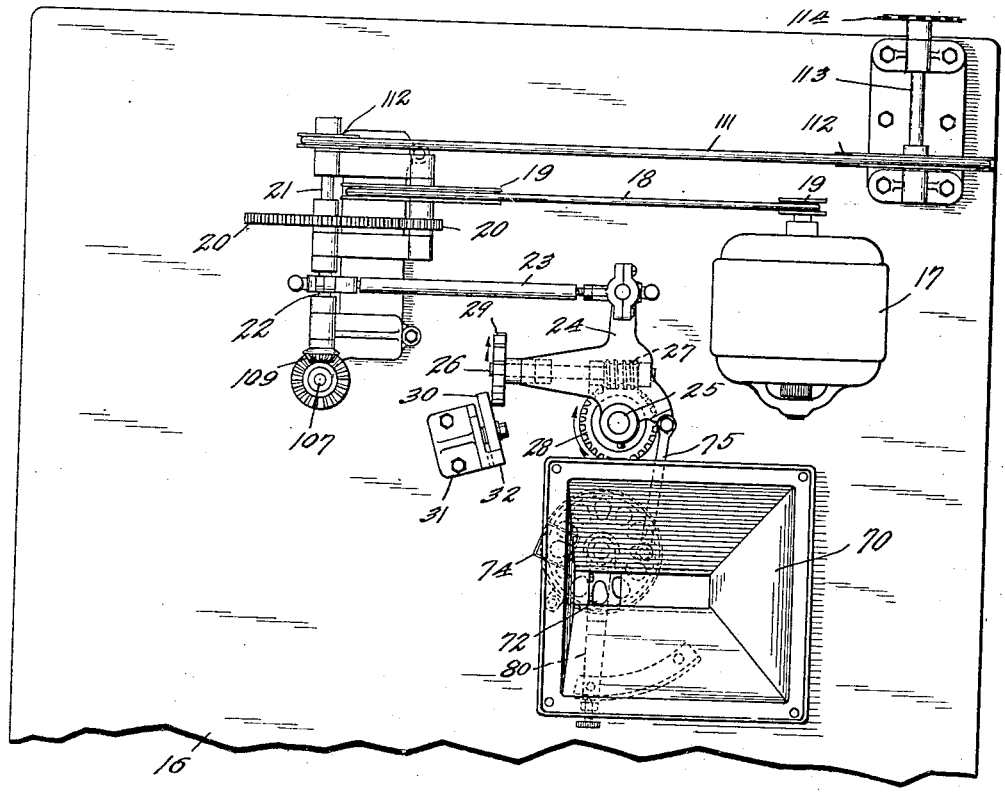
Figure 4:
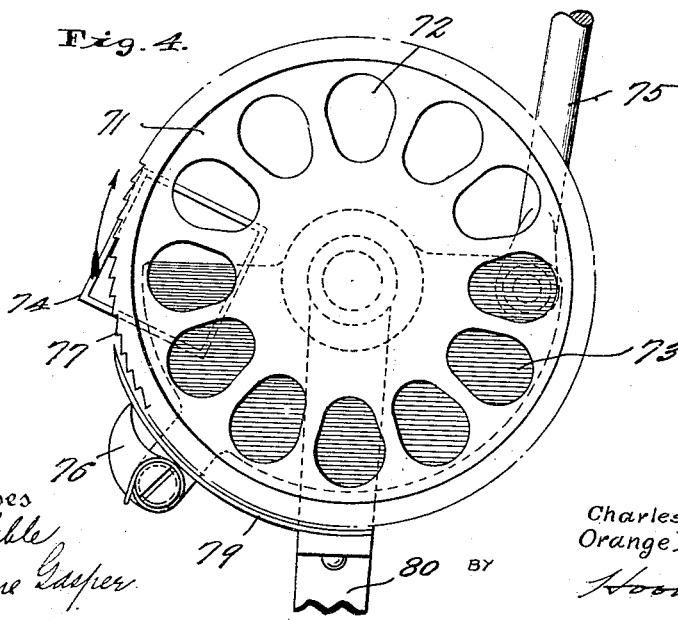
Figure 5:
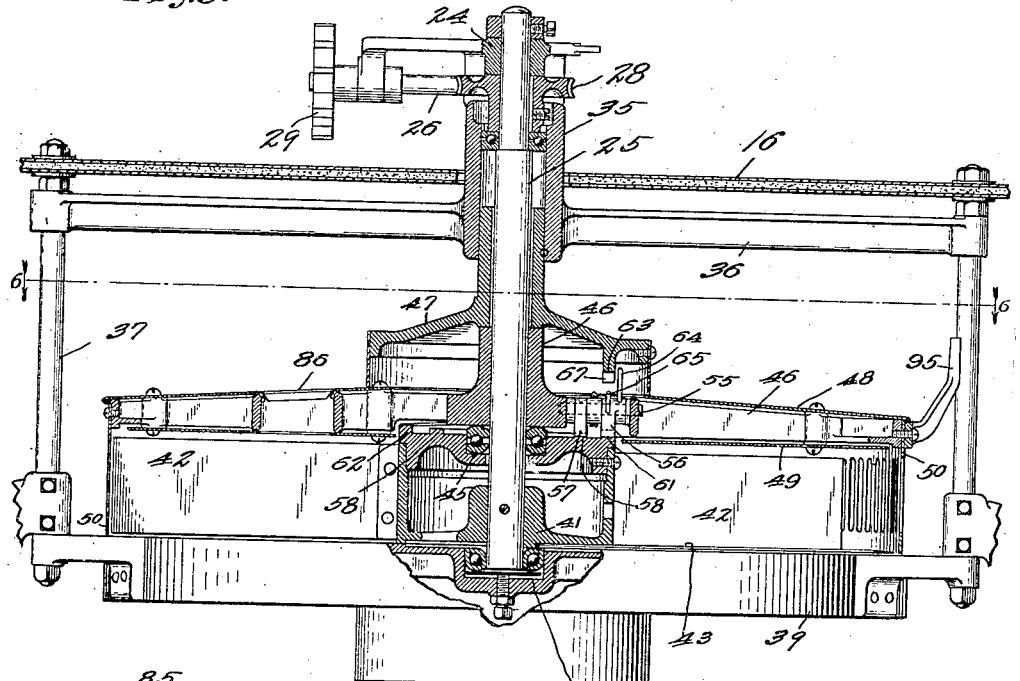
Figure 9:
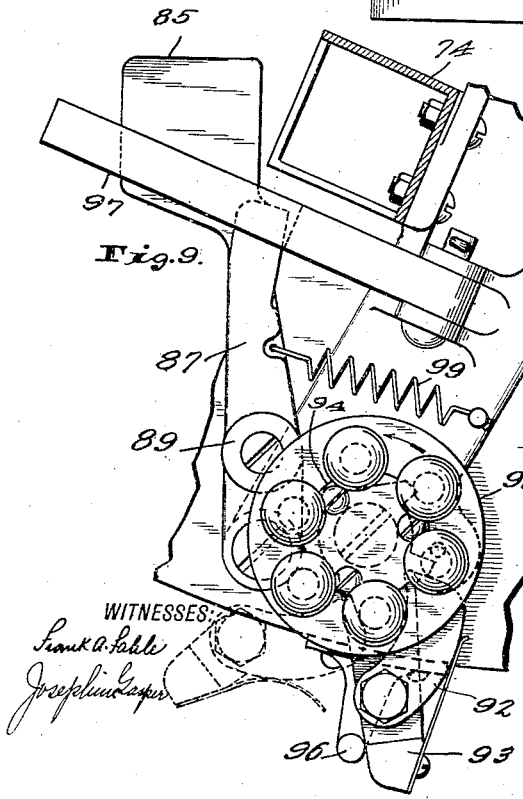
Figure 10:
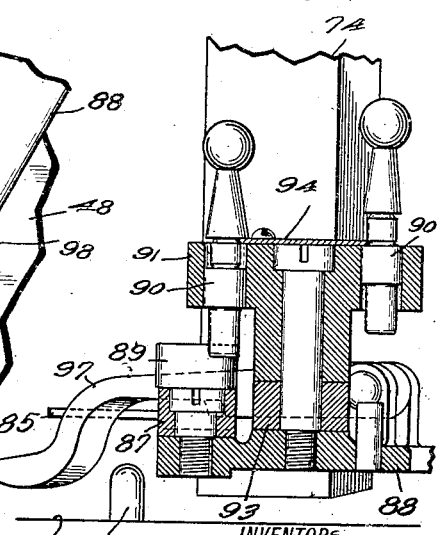
Figure 6:
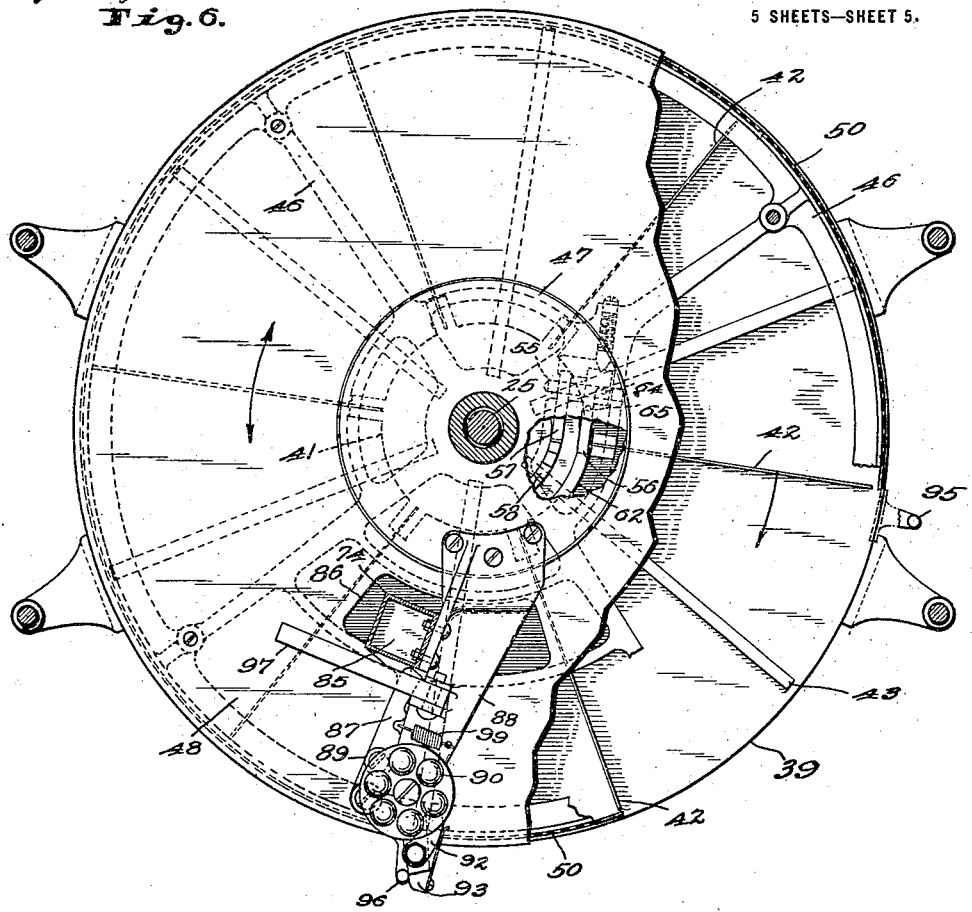
Figure 7:
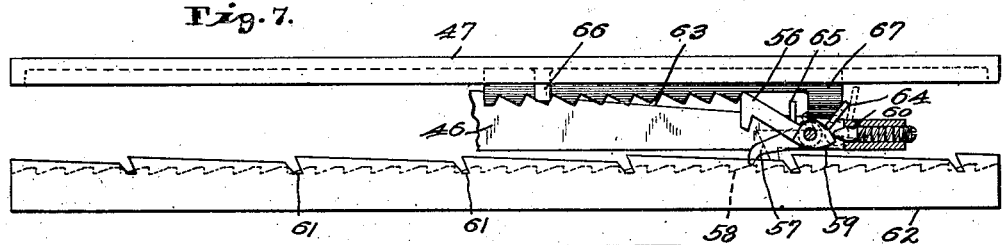
Figure 8:
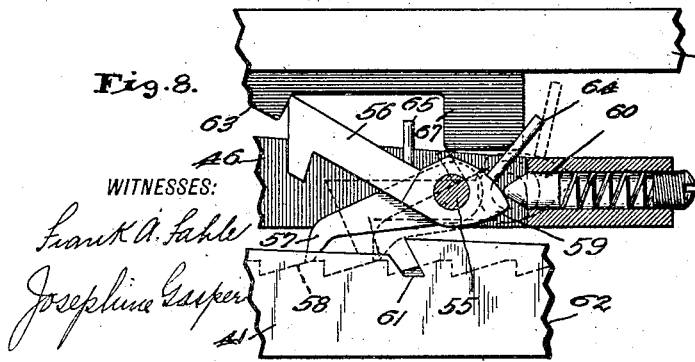

Figure 1 is a side elevation of a corn-popping machine embodying our invention; Fig. 2 is a front elevation of such machine; Fig. 3 is a partial plan thereof; Fig. 4 is a plan view on a somewhat larger scale of the corn-feed plate and its operating mechanism; Fig. 5 is a central vertical section, in partial elevation, through the popping plate, the blades and hub, and the cage, and the operating mechanism associated therewith; Fig. 6 is a section on the line 6—6 of Fig. 5; Fig. 7 is a complete development of the pawl and ratchet mechanism by which the cage is operated; Fig. 8 is an enlarged view of these same pawls, with a fragment of the associated ratchets; Fig. 9 is a plan view of the corn-feed gate and its operating mechanism; and Fig. 10 is an elevation of such feed gate, with its operating mechanism in partial section.

The popping apparatus proper is mounted within a casing having glass sides 15 and a top 16, and on this top is carried the driving mechanism and part of the feed mechanism. This driving mechanism conveniently takes the form of an electric motor 17, which is connected by a belt 18 and suitable pulleys 19 and a reducing gearing 20 to a horizontal crank shaft 21, from which power is taken for the various necessary purposes.

The crank shaft 21 has a crank 22 which is connected by a connecting rod 23 to an oscillating member 24 loosely mounted on the upper end of a vertical shaft 25, the connecting rod 23 having a universal mounting on both the crank 22 and the oscillating member 24 because they move in different planes. A horizontal shaft 26 is mounted in suitable bearings in this oscillating member 24, and is provided with a worm 27 meshing with a worm wheel 28 fixed on the shaft 25. The shaft 26 at one end also carries a ratchet wheel 29 which coöperates with a pawl 30 pivoted on a bracket 31 mounted on the top 16. When the oscillating member 24 swings in a counterclockwise direction (Fig. 3) the ratchet wheel 29 passes under the pawl 30 and one of its teeth is engaged by such pawl to turn the shaft 26 through a definite angle, thus through the worm 27 and worm wheel 28 turning the vertical shaft 25 slightly within the oscillating member 24. The pawl 30 rises as the next tooth of the wheel 29 passes under it upon the reverse movement of the oscillating member 24, and is provided with a tail coöperating with a finger 32 on the bracket 31 to permit its rising and to prevent it from dropping too far. The oscillating member 24 and shaft 25 move together save for this slight relative movement upon each complete oscillation when the ratchet wheel 29 and pawl 30 engage. Thus the shaft 25 turns alternately in opposite directions, but with a greater angular movement in one direction (clockwise in Fig. 3) than in the other, for such clockwise movement is for the full angular movement of the oscillating member 24 and the counterclockwise movement is slightly less because of the action of the pawl 30 on the ratchet wheel 29.

The shaft 25 is mounted in suitable bearings, the upper one of which is within a tube 35 carried by the upper plate 36 of a suitable frame 37 hung from the top 16 within the inclosing casing, such tube 35 projecting through the top 16, as is clear from Fig. 5, and the lower one of which is within a central depression 38 in a stationary circular popping plate 39 also carried by the frame 37. This popping plate 39 may be heated in any desired manner, conveniently by a circular gas burner 40 below it. A hub 41 is fixed on the shaft 25 near its lower end, and carries a plurality of radiating vertical sheet metal blades 42 which sweep over the upper surface of the popping plate 39 with the same oscillating and gradually advancing movement as has the shaft 25. As shown, there are six of these blades, thus providing six corn pockets, one between each blade and the next. Interspersed among the vertical blades 42 and also radiating from the hub 41 are flat blades 43 which lie flat close against the upper surface of the popping plate 39 and move in the same way as do the vertical blades 42 and the shaft 25, these flat blades 43 serving to pass under the popping corn in the pockets and lift it from the popping plate so as to prevent scorching.

Mounted above the hub 41, which is conveniently in two parts, and conveniently separated therefrom by a thrust bearing 45, is a spider 46 loose on the shaft 25, while above the spider 46 is a stationary member 47 carried by the fixed plate 36. The spider 46 is provided with a sheet metal cover 48 above it and with a separating plate 49 below it, so as to conceal the spider arms and more particularly to prevent corn from below from jumping up into the space between such arms and into the pawl and ratchet mechanism hereinafter described and controlling the operation of the spider. The spider also carries a depending cage 50 which projects almost to the upper surface of the popping plate 39 and just clears the outer edges of the blades 42, so as to hold the corn in the pockets between such blades; but this cage does not form a complete circumference but is cut away for the angle between two adjacent blades 42, or for the space of one pocket, to provide an opening through which the popped corn may escape at the proper time. The cage 50 is preferably provided with suitable perforations or slots through which the popping corn can be seen.

The spider 46 and cage 50 for the most part oscillate and progress with the shaft 25 and the blades 42, with the gap in such cage opposite some one pocket; but upon a certain definite advance the spider and cage reverse their movements and progress backward to bring the gap opposite the next pocket. To obtain this movement of the cage, the spider 46 is provided with a pin 55 on which are mounted two pawls 56 and 57. The pawl 57 acts by gravity and coöperates only with a circular series of teeth 58 on the upper surface of the hub 41, these teeth facing in a counter-clockwise direction (or rearward in relation to the progressive movement of the shaft 25 and blades 42) so that by the coöperation of the pawl 57 and teeth 58 the spider 46 and cage 50 are prevented from forward or clockwise movement relative to the shaft 25 and hub 41 but so far as such pawl and ratchet teeth are concerned are permitted a backward movement relative thereto. The pawl 56 has a pointed rear end 59 which coöperates with a spring-pressed plunger 60 so as to cause such pawl to coöperate either with a series of notches 61 in an annular 62 on the upper face of the hub 41 to prevent backward movement (or as shown any movement) of the spider 46 and cage 50 relative to the shaft 25 and hub 41 or with an arcuate series of rearwardly facing teeth 63 on the under face of the stationary member 47 to prevent forward movement of the spider 46 and cage 50 relative to such stationary member, according as such pawl 56 is down or up. Thus when the pawl 56 is down and in engagement with one of the notches 61, the spider 46 and cage 50 oscillate and progress with the shaft 25, hub 41, and blades 42, with no relative motion between them; while when such pawl is up the pawls 56 and 57 with their associated ratchet teeth cause the spider 46 and cage 50 to move backward or in a counter-clockwise direction with such shaft 25, hub 41, and blades 42, and hold them stationary during the forward or clockwise movement of such shaft and blades to produce a relative backward movement of the gap in the cage 50 to bring it toward the next pocket. The pawl 56 is provided with two upwardly projecting pins 64 and 65 which coöperate respectively with a stationary pin 66 and a stationary lug 67 carried by the stationary member 47 to throw the pawl 56 to its upper position when the cage 50 in its progressive oscillation with the blades 42 has advanced a mean angular distance equal to that between adjacent blades 42, and to throw each pawl to its lower position when the cage 50 has been moved backward through the same mean angle; so that the total forward movement of the cage, including both advance and oscillation, and likewise the total backward movement of the cage when it moves relatively to the blades 42, are, when considered in relation to the stationary member 47, each equal to the angle of oscillation plus the angle between blades 42 less the angle the blades 42 advance during the relative backward movement of the cage, for the pawl 56 is thrown upward always at the end of a forward oscillation and downward always at the end of a backward oscillation. If the pawl 56 when thrown downward does not exactly enter a notch 61, it will do so upon the next forward movement of the shaft 25 and the blades 42, the rear wall of such notch being slightly higher than the front wall thereof to prevent the pawl 56 from jumping over such notch.

The corn is fed to the pockets from a container 70 mounted on the top 16 and discharging through a hopper bottom on to a corn-feed plate 71 having a circular series of openings 72 through it; and immediately below the feed plate 71 is mounted an arc-shaped plate 73 which furnishes a bottom closure for part of the opening 72 and acts as a gate to let the corn from the openings 72 fall through into a chute 74. The plate 73 is connected by a link 75 to the oscillating member 24, so that it oscillates correspondingly, and is provided with a spring-pressed pawl 76 which coöperates with ratchet teeth 77 on the edge of the corn-feed plate 71 to feed the latter forward, or in a clockwise direction (Fig. 4). During the forward or clockwise movement the corn-feed plate 71 and the plate 73 move together, but when the plate 73 moves backward the corn-feed plate 71 remains stationary and the corn collected in an opening 72 is allowed to drop over the edge of the plate 73 into the chute 74. The rate of feed of the corn-feed plate 71 is controlled by an arc-shaped strip 79 carried by an arm 80 and adjustable around the axis of the corn-feed plate 71 so as to project between the pawl 76 and the teeth 77 for any desired part of the angle of oscillation, thus varying the amount of angular feed of the corn-feed plate 71 by the pawl 76.

Near the bottom of the chute 74 there is a gate 85 which may be moved into and out of such chute, the corn discharged from the corn feed plate 71 piling up on such gate when it is closed and dropping on through the chute and through an arc-shaped opening 86 in the spider 46, cover 48, and separating plate 49 on to the popping plate 39 when such gate is opened. The gate 85 is carried by a pivoted arm 87 mounted on a bracket 88 carried by the stationary member 47, and the pivoted arm 87 is provided with a roller 89 which may coöperate with a circular series of pins 90 carried by a member 91 rotatably mounted on the bracket 88. The pins 90 also coöperate as ratchet teeth with a spring-pressed pawl 92 carried by a pawl arm 93 mounted to swing on the same pivot pin as does the rotatable member 91, the pawl 92 being in a higher plane than is the roller 89. Each pin 90 has two positions, in the lower of which (shown at the left in Fig. 10) it coöperates with both the roller 89 and the pawl 92, and in the higher of which (shown at the right in Fig. 10) it clears the roller 89 but still coöperates with the pawl 92. The pins may be moved to either of these positions independently of one another, but are held in the desired positions by a spring latch 94 common to all the pins. The pawl arm 93 is operated by two fingers 95 and 96 carried by the spider 46, these fingers being spaced apart by substantially the angle of oscillation of the blades 42 plus the angle between adjacent blades 42, so that the finger 95 strikes the pawl arm 93 and swings it from full to dotted line position (Fig. 9) at the end of the same forward stroke on which the pawl 56 is swung upward, and the finger 96 strikes such pawl arm and swings it from dotted to full line position at the end of the same backward stroke on which the pawl 56 is swung downward. During this latter movement of the pawl arm, the pawl 92 acting on one of the pins 90 moves the rotatable member 91 in a counter-clockwise direction (Fig. 9) regardless of whether such pin 90 is raised or lowered, and the opposite pin 90 if in lowered position acts on the roller 89 to swing the gate arm 87 and gate 85 from the closed position shown in Fig. 6 to the open position shown in Fig. 9, thus permitting any corn which has accumulated on such gate 85 to drop through on to the popping plate 39 in the pocket whose outer edge has just been closed by the relative backward movement of the cage 50. By raising the pins 90 as desired, any of the pockets may thus be cut out of active operation, as when the demand is light. In order to insure that the gate 85 remains open for a sufficient time to allow all the corn thereon to drop through, a latch 97 is pivoted on the bracket 88 so as to catch the gate arm 87 when the gate 85 is swung to open position (shown in Fig. 9) and this latch has an outer end which lies in the path of an upwardly projecting pin 98 carried by the spider 46 so that upon the next movement of such spider in a clockwise direction, after the completion of the counter-clockwise movement thereof which caused the outward movement of the gate 85, the pin 98 lifts the latch 97 to release the gate arm 87 and allow a spring 99 acting on the latter to swing it and the gate 85 to closed position.

When the pop corn is discharged from an open pocket between blades 42, it falls into a hopper 100 which discharges at the bottom on to an endless conveyer 101 the lower stretch of which travels in a trough 102. The popped corn remains on the upper stretch of this conveyer 101, and is carried thereby to a chute 103 which carries it over the cylinder 104 of a buttering device; but any unpopped corn falls through the spaces between the strips of the conveyer on to the lower stretch thereof and is carried by the lower stretch to the right (Fig. 2) into a receptacle 105 for receiving the unpopped and useless corn. The belt conveyer 101 is driven by a horizontal shaft 106 connected through a vertical shaft 107 and suitable bevel gearing 108 and 109 to the crank shaft 21; and the cylinder 104 is driven by a chain 110 and suitable sprockets from the shaft 106. The crank shaft 21 may also be suitably connected for driving any other mechanism, indicated by the belt 111 and suitable pulleys 112 connecting such crank shaft 21 to a counter-shaft 113 having a suitable sprocket 114 for any suitable purpose.

In operation, a supply of pop corn is placed in the container 70, and the motor 17 is started into operation. The motor 17 drives the crank shaft 21, which in turn oscillates the oscillating member 24 to produce an oscillation and progressive advance of the shaft 25 and blades 42, and to operate the corn-feed plate 71. The corn-feed plate receives corn from the hopper 70, and is fed forward at a rate determined by the setting of the arc-shaped member 79. Corn is discharged from the successive openings 72 of the corn-feed plate 71 on to the gate 85, accumulating on the latter between successive operations thereof. When the gate 85 is opened the corn drops therethrough on to the popping plate 39, into a just closed pocket, and is carried around in such pocket for almost a complete rotation. During this rotation, the corn is continually agitated by the oscillation of the vertical blades 42 and the flat blades 43, and is effectively prevented from scorching. During this time the popping takes place, the heat of the popping plate 39 being regulated to produce the desired popping in that time. Corn is thus fed into the successive pockets, or into such of them as have their corresponding pins 90 lowered. As each pocket is thus traveling around over the popping plate, its outer edge is closed by the cage 50, which for the most part oscillates and advances with the blades 42. As each pocket is nearly completing its rotation, and the popping operation has been completed in it, the preceding pocket is discharging through the gap in the cage 50, which gap remains opposite the discharging pocket during the oscillations and progressive advance thereof for a mean advance of an angle equal to the angle of the pocket. When this mean advance has been completed, the finger 95 strikes the pawl arm 93 to throw it to the dotted line position (Fig. 9) and the pin 64 strikes the stationary pin 66 to tilt the pawl 56 to its upper position. This is at the end of a forward oscillation. The next backward oscillation occurs as before, the cage 50 moving backward with the cage 42 because of the interaction of the pawl 57 and teeth 58; but at the end of such backward oscillation the pawl 56 and teeth 63 prevent the cage from moving forward with the blades 42 as the latter move forward, so that the cage stands still, or moves backward relatively to the blades 42. Upon the next backward oscillatiton of the blades the cage is again carried backward with them, by the pawl 57 and teeth 58, and at the end of such backward movement again remains stationary while the blades 42 move forward. This occurs until the relative backward movement of the cage 50 with relation to the blades 42 has closed the pocket which has been discharging and has opened the next pocket behind it. Then the pin 65 strikes the lug 67 to tilt the pawl 56 downward into engagement with the annulus 62, thus interlocking the cage 50 and blades 42 so that they will oscillate and progressively advance together; and at the same time the finger 96 strikes the pawl arm 93 so that the pawl 92 acting on a pin 90 turns the rotatable member 91 and another pin 90 opens the gate 85 to drop a charge of corn into the pocket which has just been closed by the cage 50. The pocket in the rear of this has now been opened by the relative backward movement of the cage 50, and discharges the popped corn therein by the operation of the radial blades 42 forming the sides of such pockets. This popped corn drops on to the conveyer 101 and is carried over the buttering cylinder 104 and deposited in the bottom of the casing, where it makes an attractive appearance. Each pocket is opened for a progressive advance equal to the angle of such pocket—one-sixth of a rotation in the apparatus shown, where there are six pockets; and at the end of such progressive advance the cage 50 is given a relative rearward movement equal to the advance which it has just made, for closing that pocket and opening the next pocket, and the just closed pocket receives a charge of corn which is popped by the time that pocket is again opened.

We claim as our invention:

1. A corn-popping machine, comprising a stationary popping plate, a set of radiating blades rotatably mounted to move over said popping plate and forming pockets between them, a rotatable driving member, connections between said rotatable driving member and said set of blades for oscillating the latter and progressively advancing them, a cage coöperating with said blades and forming the outer walls of such pockets, said cage having an opening, and means connecting said cage and said blades for causing the cage alternately to oscillate and progressively advance with said blades and to move backward relatively to said blades.

2. A corn-popping machine, comprising a stationary popping plate, a set of radiating blades rotatably mounted to move over said popping plate and forming pockets between them, a rotatable driving member, and connections between said rotatable driving member and said set of blades for oscillating the latter and progressively advancing them.

3. A corn-popping machine, comprising a stationary popping plate, a set of radiating blades rotatably mounted to move over said popping plate and forming pockets between them, a rotatable driving member, connections between said rotatable driving member and said set of blades for oscillating the latter and progressively advancing them, a cage coöperating with said blades and forming the outer walls of such pockets, said cage having an opening, and means for causing said cage alternately to advance with said blades and to move backward relatively thereto to vary the position of said opening relatively to said pockets.

4. A corn-popping machine, comprising a stationary popping plate, a set of radiating blades rotatably mounted to move over said popping plate and forming pockets between them, a rotatable driving member, connections between said rotatable driving member and said set of blades for oscillating the latter and progressively advancing them, a cage coöperating with said blades and forming the outer walls of said pockets, said cage having an opening, and means for alternately locking said cage to said blades and for producing relative backward movement of said cage and the opening therein relative to said blades upon the oscillation of the latter.

5. A corn-popping machine, comprising a stationary popping plate, a set of radiating blades rotatably mounted to move over said popping plate and forming pockets between them, a rotatable driving member, connections between said rotatable driving member and said set of blades for oscillating the latter and progressively advancing them, a cage coöperating with said blades and forming the outer walls of such pockets, said cage having an opening, and pawl-and-ratchet mechanism which in one position locks the cage and blades together and in another permits backward movement of the cage and its opening and prevents forward movement thereof.

6. A corn-popping machine, comprising a stationary popping plate, a set of radiating blades rotatably mounted to move over said popping plate and forming pockets between them, a rotatable driving member, connections between said rotatable driving member and said set of blades for oscillating the latter and progressively advancing them, a cage coöperating with said blades and forming the outer walls of such pockets, said cage having an opening, means connecting said cage and said blades for causing the cage alternately to oscillate and progressively advance with said blades and to move backward relatively to said blades, and feed mechanism for feeding corn to a pocket upon the closing thereof by the backward movement of said cage relative to said blades.

7. A corn-popping machine, comprising a stationary popping plate, a set of radiating blades rotatably mounted to move over said popping plate and forming pockets between them, a rotatable driving member, connections between said rotatable driving member and said set of blades for oscillating the latter and progressively advancing them, a cage coöperating with said blades and forming the outer walls of such pockets, said cage having an opening, means for causing said cage alternately to advance with said blades and to move backward relatively thereto to vary the position of said opening relatively to said pockets, and feed mechanism for feeding corn into a pocket upon a backward movement of said cage relative to said blades.

8. A corn-popping machine, comprising a stationary popping plate, a set of radiating blades rotatably mounted to move over said popping plate and forming pockets between them, a rotatable driving member, connections between said rotatable driving member and said set of blades for oscillating the latter and progressively advancing them, a cage coöperating with said blades and forming the outer walls of such pockets, said cage having an opening, means connecting said cage and said blades for causing the cage alternately to oscillate and progressively advance with said blades and to move backward relatively to said blades, and feed mechanism for feeding corn to a pocket upon the closing thereof by the backward movement of said cage relative to said blades, said feed mechanism being provided with means for selectively rendering it inoperative for any normal feed operation.

9. A corn-popping machine, comprising a stationary popping plate, a set of radiating blades rotatably mounted to move over said popping plate and forming pockets between them, a rotatable driving member, connections between said rotatable driving member and said set of blades for oscillating the latter and progressively advancing them, a cage coöperating with said blades and forming the outer walls of such pockets, said cage having an opening, means for causing said cage alternately to advance with said blades and to move backward relatively thereto to vary the position of said opening relatively to said pockets, and feed mechanism for feeding corn into a pocket upon a backward movement of said cage relative to said blades, said feed mechanism being provided with means for selectively rendering it inoperative for any normal feed operation.

10. A corn-popping machine, comprising a stationary popping plate, a set of blades mounted to move over said popping plate and forming pockets between them, a driving member, and connections between said driving member and said set of blades for oscillating the latter and progressively advancing them.

11. A corn-popping machine, comprising a stationary popping plate, a set of blades mounted to move over said popping plate and forming pockets between them, a driving member, connections between said driving member and said set of blades for oscillating the latter and progressively advancing them, a cage coöperating with said blades and having an opening, and means connecting said cage and said blades for causing the cage alternately to oscillate and progressively advance with said blades and to move backward relatively to said blades.

12. A corn-popping machine, comprising a stationary popping plate, a set of blades mounted to move over said popping plate and forming pockets between them, a driving member, connections between said driving member and said set of blades for oscillating the latter and progressively advancing them, a cage coöperating with said blades and having an opening, and means for causing said cage alternately to advance with said blades and to move backward relatively thereto to vary the position of said opening relatively to said pockets.

13. A corn-popping machine, comprising a stationary popping plate, a set of blades mounted to move over said popping plate and forming pockets between them, a driving member, connections between said driving member and said set of blades for oscillating the latter and progressively advancing them, a cage coöperating with said blades and having an opening, and means for alternately locking said cage to said blades and for producing relative backward movement of said cage and the opening therein relative to said blades upon the oscillation of the latter.

14. A corn-popping machine, comprising a stationary popping plate, a set of blades mounted to move over said popping plate and forming pockets between them, a driving member, connections between said driving member and said set of blades for oscillating the latter and progressively advancing them, a cage coöperating with said blades and having an opening, and pawl-and-ratchet mechanism which in one position locks the cage and blades together and in another permits backward movement of the cage and its opening and prevents forward movement thereof.

15. A corn-popping machine, comprising a stationary popping plate, a set of blades mounted to move over said popping plate and forming pockets between them, a driving member, connections between said driving member and said set of blades for oscillating the latter and progressively advancing them, a cage coöperating with said blades and having an opening, means connecting said cage and said blades for causing the cage alternately to oscillate and progressively advance with said blades and to move backward relatively to said blades, and feed mechanism for feeding corn to a pocket upon the closing thereof by the backward movement of said cage relative to said blades.

16. A corn-popping machine, comprising a stationary popping plate, a set of blades mounted to move over said popping plate and forming pockets between them, a driving member, connections between said driving member and said set of blades for oscillating the latter and progressively advancing them, a cage coöperating with said blades and having an opening, means for causing said cage alternately to advance with said blades and to move backward relatively thereto to vary the position of said opening relatively to said pockets, and feed mechanism for feeding corn into a pocket upon a backward movement of said cage relative to said blades.

In witness whereof, we have hereunto set our hands at Indianapolis, Indiana, this seventh day of December, A. D. one thousand nine hundred and sixteen.

CHARLES A. TRIPP.
ORANGE E. McMEANS.

Copies of this patent may be obtained for five cents each, by addressing the "Commissioner of Patents Washington, D. C."